Feb. 8, 1944.      R. C. HERR      2,341,143
STRAW AND FOLIAGE CUTTER ATTACHMENT FOR PLOWS
Filed April 22, 1941     2 Sheets-Sheet 2

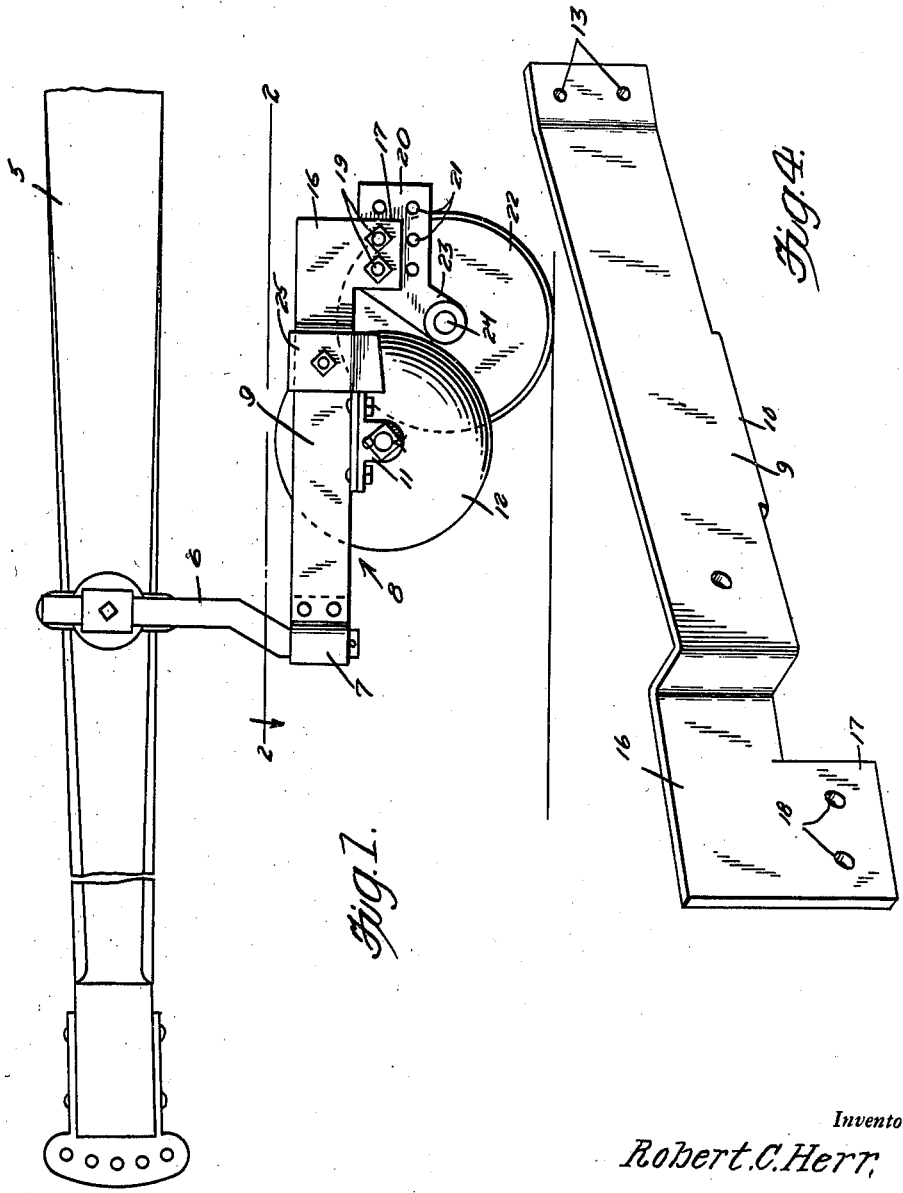
Inventor
Robert C. Herr,

Inventor
Robert C. Herr.

By *Clarence A. O'Brien*

Attorney

Patented Feb. 8, 1944

2,341,143

UNITED STATES PATENT OFFICE 2,341,143

STRAW AND FOLIAGE CUTTER ATTACHMENT FOR PLOWS

Robert C. Herr, Gaston, Oreg.

Application April 22, 1941, Serial No. 389,808

3 Claims. (Cl. 97—209)

This invention relates to new and useful improvements in straw and foliage cutters and more particularly to a device of this character for installation in conjunction with conventional plows.

The principal object of the present invention is to provide a straw and foliage cutter attachment for plows which can be installed without difficulty and without modification of the conventional plow.

Other objects and advantages of the invention will become apparent to the reader of the following specification.

In the drawings—

Figure 1 represents a fragmentary side elevational view showing the attachment applied to a plow shank.

Figure 4 is a perspective view of one of the side members of the frame.

Figure 3:
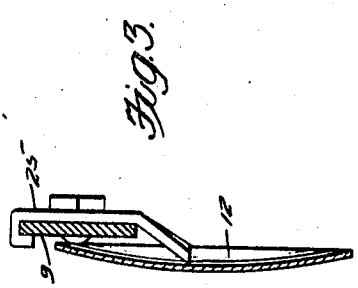
Figure 3 is a sectional view through one of the disks and complementary supporting means.

Referring to the drawings wherein like numerals designate like parts, it can be seen in Figure 1 that numeral 5 denotes a plow shank to which the upper end of a shaft 6 is secured. This shaft has an offset lower end portion which extends downwardly through a barrel 7 at the forward end of the frame of the present invention which is generally referred to by numeral 8.

The frame of the attachment consists of a pair of elongated side members 9, 9 which at their lower intermediate portions are provided with outwardly disposed ledges 10 to which are secured bearings 11 and these bearings accommodate the stub shafts of disks 12.

The forward ends of the side members 9 are formed with openings 13 through which securing means 14 are disposed and these securing means are also disposed through a tongue 15 which extends laterally from the barrel 7.

Figure 2:
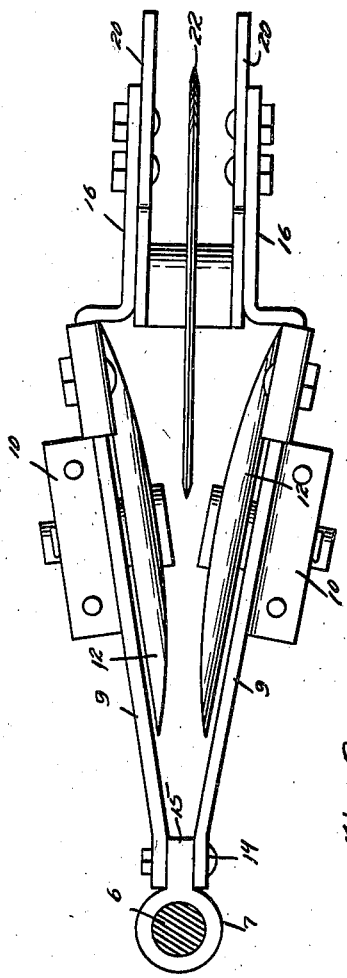
Figure 2 is a sectional view taken substantially on the line 2—2 of Figure 1.
Figure 5:
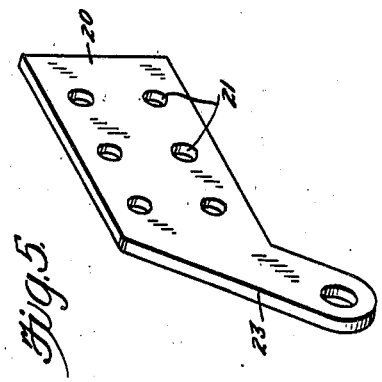
Figure 5 is a perspective view of one of the adjusting plates.

The side members 9 are disposed in diverged relation to the extent substantially shown in Figure 2 and have offset tail portions 16, each tail portion having a depending portion 17 apertured as at 18 to accommodate bolts 19.

An adjusting plate 20 is provided for each tail portion 16 and this adjusting plate 20 is provided with a plurality of openings 21 vertically and horizontally spaced so as to selectively receive the bolts 19, to the end that the plate can be positioned at the desired elevation to accommodate a rolling colter 22, it being seen that the forward ends of the plate 20 are provided with inclined legs 23 and formed with bearings to accommodate the ends of shaft 24 of the said colter 22.

Scrapers 25 are mounted on the side members 9 for scraping the disks 12.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cutting attachment for plows comprising a pair of converging members, a hanger bar, a collar secured to the hanger bar, a lug projecting laterally from the collar and to which the adjacent ends of the members are secured, a pair of converging discs carried by the converging members, the converging members provided with a pair of parallel extensions, and a straw cutter mounted between the parallel extensions.

2. A cutting attachment for plows comprising a pair of converging members, a hanger bar, a collar secured to the hanger bar, a lug projecting laterally from the collar and to which the adjacent ends of the members are secured, a pair of converging discs carried by the converging members, the converging members provided with a pair of parallel extensions, and a straw cutter mounted between the parallel extensions and an adjustable connection between the straw cutter and the parallel extension.

3. A cutting attachment for plows combining a pair of converging members, a hanger bar, a collar secured to the hanger bar, a lug projecting laterally from the collar and to which the adjacent ends of the members are secured, a pair of converging discs carried by the converging members, the converging members provided with a pair of parallel extensions, and a straw cutter mounted between the parallel extensions and an adjustable connection between the straw cutter and the parallel extension, said adjustable means comprising a pair of plates, each of the extensions having a depending portion formed with openings, plates having a plurality of openings therein, securing members for disposition through the openings of the depending portions and the plates, each of said plates provided with an inclined leg, bearings carried by the legs, said cutter having a shaft disposed through said bearings.

ROBERT C. HERR.